UNITED STATES PATENT OFFICE.

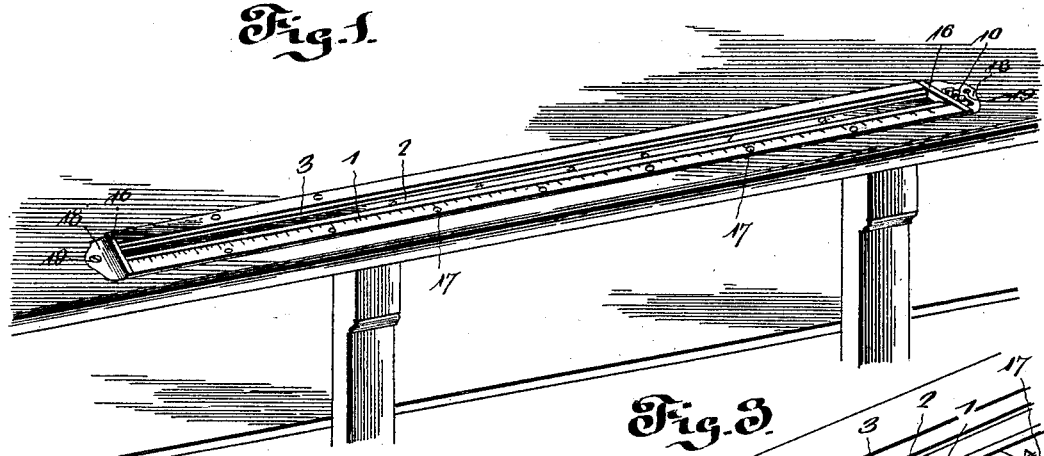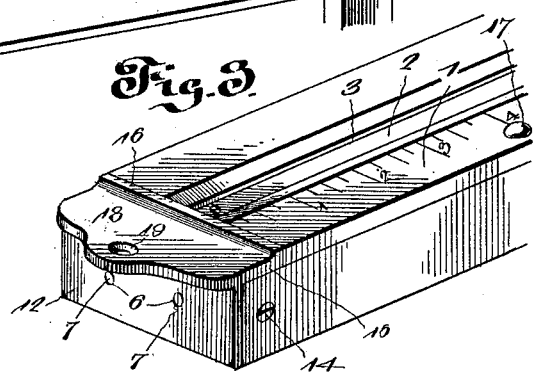

EWALD PRAEGER, OF SAN ANTONIO, TEXAS.

YARDSTICK CALCULATOR.

SPECIFICATION forming part of Letters Patent No. 630,005, dated August 1, 1899.

Application filed October 13, 1898. Serial No. 693,413. (No model.)

*To all whom it may concern:*

Be it known that I, EWALD PRAEGER, a citizen of the United States, residing at San Antonio, in the county of Bexar and State of Texas, have invented a new and useful Yardstick Calculator, of which the following is a specification.

My invention relates to a calculating-yardstick adapted for use in connection with dry-goods or other business wherein goods are sold by linear measurement; and the object in view is to provide in connection with a linear measuring scale or rule an indicating device provided with a plurality of price-scales having relation to the measuring-scale and adapted to indicate the price of a given length of an article at a given price per unit of measure and also adapted to indicate the length of an article of a given price which may be sold for a given amount, the device thus constructed being adapted to be countersunk in and arranged with its upper surface flush with the surface of a counter or table and being provided upon its upper surface with projections or knobs indicating fractional parts of a yard or other unit of measure.

The particular object of my present invention, which consists in an improvement upon the construction shown and described in my former patent, No. 566,867, granted September 1, 1896, is to provide means for supporting the extremities of the yardstick or other measuring rule or scale with relation to the price-indicating web or device and also for securing the yardstick in a fixed position in a counter or table.

Further objects and advantages of this invention will appear in the following description, and the novel features thereof will be particularly pointed out in the appended claims.

In the drawings, Figure 1 is a perspective view of a measuring device constructed in accordance with my invention, the same being shown countersunk in the surface of a counter or table. Fig. 2 is a similar view of one end of the measuring device detached from the counter. Fig. 3 is a similar view of the other end. Fig. 4 is a partial longitudinal section. Fig. 5 is an end view, partly broken away to show the means for communicating motion to the web-carrying rolls or drums. Figs. 6 and 7 are detail views in perspective of the end plates detached.

Similar numerals of reference indicate corresponding parts in all the figures of the drawings.

1 designates a measuring scale or rule which in the construction illustrated consists of a yardstick recessed to form a hollow case, in the interior or cavity of which is arranged a price-indicating device 2, consisting of a continuous web of flexible material which is visible through an inspection-slot 3, extending longitudinally of the scale or rule, whereby the numerals on said indicating device, which represent different prices per yard or other unit of measurement, may be brought contiguous to the graduations of the measuring scale or rule. In the construction illustrated the web is carried by rollers or drums 4 and 5, mounted at their extremities in bearings 6 in the end walls of the casing and preferably provided with terminal trunnions 7 to fit in said bearings. Furthermore, the rolls or drums are provided near one end and in a common transverse plane with pinions 8 and 9, engaged by an operating or master gear 10, whereby simultaneous motion in a common direction may be communicated to the two rolls or drums to advance the indicating-web in the desired direction.

The end walls of the yardstick illustrated in the drawings consist of plates 11 and 12, preferably of metal, having inwardly-extending side ears 13, arranged in contact with the inner surfaces of the side walls of the casing and adapted to be secured in place by means of screws 14, extending through said side walls and engaging openings in the ears. Also these end plates are flanged inwardly at their upper edges, as shown at 15, to overlap the upper edges of the side walls, and at the inner edges of these flanges are formed raised thumb-ribs 16, which serve as guides to the fingers of the clerk in measuring off yards or fractions of yards of such materials as ribbon, dress-goods, muslin, &c. Also the upper surface of the measuring scale or rule is provided at intervals with slightly-projecting knobs 17, forming guides whereby fractional parts of a yard or other unit of measurement may be measured without visual reference to the measuring scale or rule. Also the end plates of the construction illustrated are extended outwardly at their upper edges flush with the said inwardly-extending flanges to form securing-ears 18, having screw-holes 19 and adapted to be arranged flush with the upper surface of a counter or table in connection with which the scale or rule is used. The thumb-ribs at the inner edges of the horizontal flanges of the end plates are preferably made flush with the upper surface of the measuring scale or rule, whereby they project sufficiently above the surface of the counter or table to enable the operator to readily discover the same by the sense of feeling in the measurement of flexible goods. Also extending inwardly from the horizontal flanges of the end plates are lugs 20 for terminally supporting the parts of the top wall of the measuring scale or rule and preventing downward pressure exerted upon said top from displacing the same.

It will be understood that any suitable system of graduations may be employed upon the web and also that the graduations of the scale or rule may be in accordance with any desired system, neither of said points forming a part of my present invention, and also that various changes in the form, proportion, and the minor details of construction may be resorted to without departing from the spirit or sacrificing any of the advantages of this invention.

Having described my invention, what I claim is—

1. A linear measuring device or rule comprising a hollow bar provided with end walls consisting of plates having inwardly-extending ears, means for securing the side walls of the bar to said ears, securing-ears arranged parallel and approximately flush with the upper surface of the bar and extending outwardly from said end plates, a price-indicating device having parallel rolls or drums and a continuous web connecting said rolls and arranged within the hollow bar for exposure through a longitudinal inspection-slot in the upper wall thereof, and means for simultaneously advancing the rolls or drums in a common direction, substantially as specified.

2. A linear measuring device or rule comprising a hollow bar provided with metallic end plates, side walls terminally secured to the end plates, supporting-lugs extending inwardly from said end walls, a sectional top wall supported by the upper edges of the side walls and said lugs and separated at their contiguous edges to form an inspection-slot, and a price-indicating device having parallel longitudinally-disposed rolls or drums mounted in the bar and carrying a continuous web adapted to be advanced transversely in either direction to bring different portions of its surface into view through said inspection-slot, substantially as specified.

3. A linear measuring device or rule comprising a hollow bar, and a price-indicating device having parallel rolls or drums mounted within said bar and carrying a continuous web adapted to be advanced transversely to bring different portions of its surface into view through a longitudinal inspection-slot in the top wall of the bar, said bar being provided at the extremities of its measuring scale or rule with raised transverse thumb-ribs, of which the outer sides are coincidental with the initial and terminal points of the measuring-scale, substantially as specified.

4. A linear measuring device or rule comprising a hollow bar, and a price-indicating device having parallel rolls or drums mounted within said bar and carrying a continuous web adapted to be advanced transversely to bring different portions of its surface into view through a longitudinal inspection-slot in the top wall of the bar, said bar being provided at the extremities of its measuring scale or rule with raised transverse thumb-ribs, of which the outer sides are coincidental with the initial and terminal points of the measuring-scale, and intermediate spaced projections or knobs arranged at intervals corresponding with fractional parts of the unit of measurement of said rule, and disposed in the transverse planes, respectively, of the scale graduations indicating said fractional measurements, substantially as specified.

In testimony that I claim the foregoing as my own I have hereto affixed my signature in the presence of two witnesses.

EWALD PRAEGER.

Witnesses:
C. M. KINGSLEY,
B. EARLY.